United States Patent
Kobayashi et al.

(10) Patent No.: US 8,493,529 B2
(45) Date of Patent: Jul. 23, 2013

(54) LIQUID CRYSTAL DISPLAY DEVICE

(75) Inventors: Junichi Kobayashi, Ishikawa-ken (JP);
Yoshio Iwai, Ishikawa-ken (JP);
Kazuyuki Harada, Ishikawa-ken (JP);
Yasuhiro Yamamoto, Ishikawa-ken (JP)

(73) Assignee: Japan Display Central Inc., Fukaya-shi (JP)

( * ) Notice: Subject to any disclaimer, the term of this patent is extended or adjusted under 35 U.S.C. 154(b) by 240 days.

(21) Appl. No.: 13/153,891

(22) Filed: Jun. 6, 2011

(65) Prior Publication Data

US 2011/0310336 A1    Dec. 22, 2011

(30) Foreign Application Priority Data

Jun. 18, 2010 (JP) ................................. 2010-139754

(51) Int. Cl.
*G02F 1/1335* (2006.01)
(52) U.S. Cl.
USPC ............. 349/106; 349/84; 349/104; 349/105; 349/107; 349/108
(58) Field of Classification Search
USPC ............. 349/56, 84, 104, 105, 106, 107, 108
See application file for complete search history.

(56) References Cited

U.S. PATENT DOCUMENTS

| | | | | |
|---|---|---|---|---|
| 6,816,219 B2 * | 11/2004 | Akagi et al. | .................. | 349/125 |
| 8,284,355 B2 * | 10/2012 | Tokuda et al. | ................ | 349/110 |
| 2007/0002258 A1 * | 1/2007 | Wu | ............................. | 349/155 |

FOREIGN PATENT DOCUMENTS

JP    2009-282262    12/2009

OTHER PUBLICATIONS

U.S. Appl. No. 13/371,798, filed Feb. 13, 2012, Harada, et al.
U.S. Appl. No. 13/489,046, filed Jun. 5, 2012, Yamakawa, et al.

* cited by examiner

*Primary Examiner* — Jennifer Doan
(74) *Attorney, Agent, or Firm* — Oblon, Spivak, McClelland, Maier & Neustadt, L.L.P.

(57) ABSTRACT

In one embodiment, a liquid crystal display device includes first and second substrates, an active area to display an image, a seal material surrounding the active area, and an intermediate area between the active area and the seal area. In the intermediate area, first and second color filters are formed on the second substrate. An overcoat layer is laminated on the first and second color filters. First and second pillar-shaped spacers are provided between the overcoat layer and the first substrate corresponding to the first and second color filters to form a first and second cell gaps between the first and second substrates, respectively. The first cell gap adjacent to the active area between the first and second substrates is smaller than the second cell gap adjacent to the seal area in the intermediate area.

20 Claims, 13 Drawing Sheets

LIQUID CRYSTAL DISPLAY DEVICE

CROSS-REFERENCE TO RELATED APPLICATION

This application is based upon and claims the benefit of priority from Japanese Patent Application No. 2010-139754, filed Jun. 18, 2010, the entire contents of which are incorporated herein by reference.

FIELD

Embodiments described herein relate generally to a liquid crystal display device.

BACKGROUND

Liquid crystal display devices are widely used as display devices for various kinds of equipments such as personal computers, OA equipments, and TV sets because the liquid crystal display devices have many advantages such as lightness, compactness and low power consumption. In recent years, the liquid crystal display device has also been used in mobile terminal equipments such as a mobile phone, a car navigation device and a game player.

In the liquid crystal display device, a pair of substrates is arranged opposing each other. A cell gap holding a liquid crystal layer is formed, for example, by preparing a pillar-shaped spacer formed in one substrate and a spacer seat layer formed on another substrate.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION OF THE INVENTION

Figure 1:
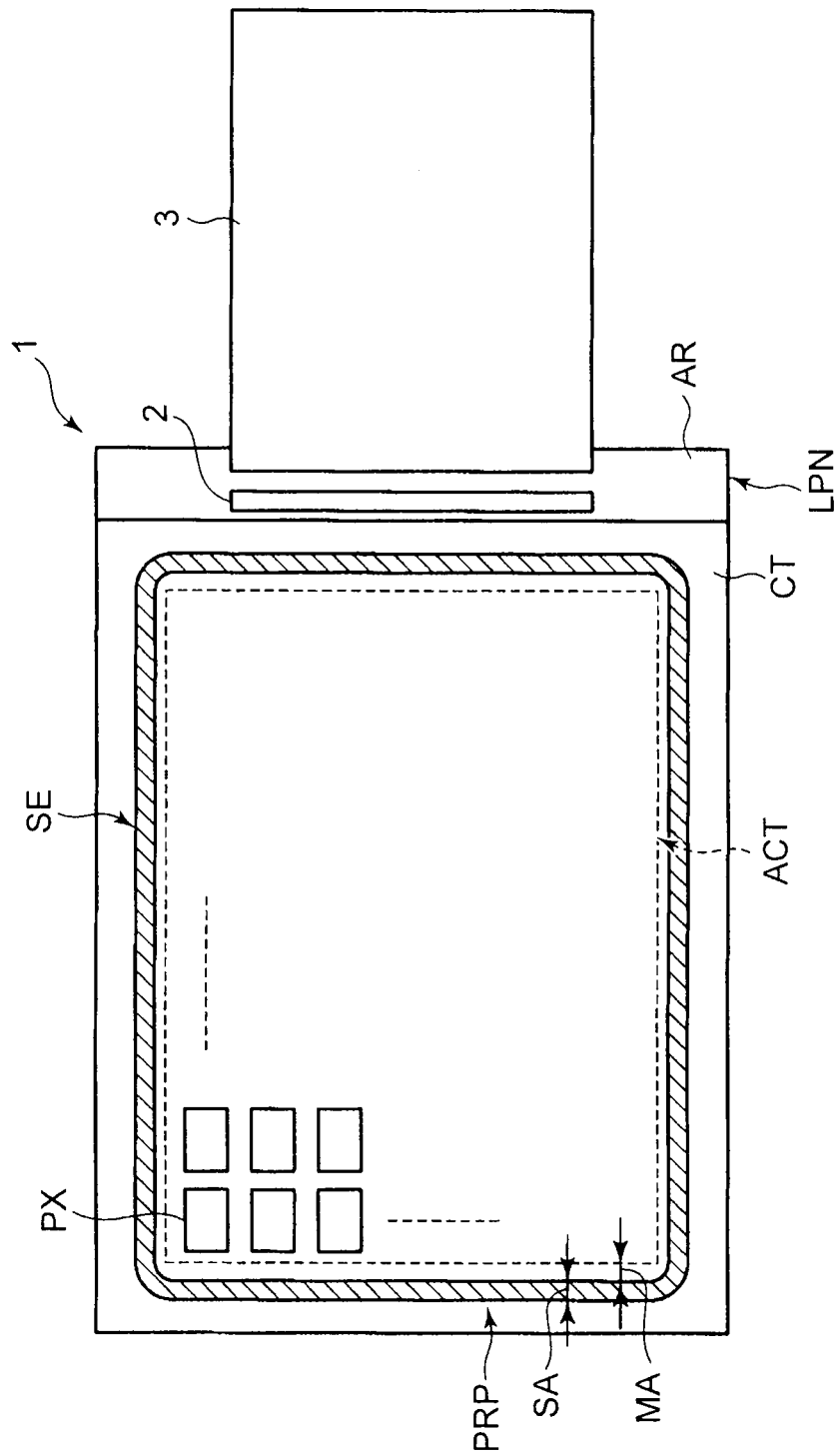
FIG. 1 is a plan view schematically showing a composition of a liquid crystal display device according to one embodiment.

A liquid crystal device according to an exemplary embodiment of the present invention will now be described with reference to the accompanying drawings wherein the same or like reference numerals designate the same or corresponding portions throughout the several views.

In one embodiment, a liquid crystal display device includes: a first substrate including; a pixel electrode arranged in an active area to display an image in the first substrate, a seal area surrounding the active area, and a first pillar-shaped spacer arranged adjacent to the active area and a second pillar-shaped spacer arranged adjacent to the seal area in an intermediate area located between the active area and the seal area, a second substrate including; a peripheral light shielding layer extending from the intermediate area to the seal area, a first color filter of a first width laminated on the peripheral light shielding layer right above the first pillar-shaped spacer in the shape of a belt or an island, a second color filter of a second width different from the first width, the second color filter being laminated on the peripheral light shielding layer right above the second pillar-shaped spacer in the shape of a belt or an island, and an overcoat layer laminated on the first and second color filters, a seal material arranged on the seal area of the first substrate to attach the first and second substrates in the shape of a closed loop; and a liquid crystal layer held between the first and second substrates; wherein the thickness of the overcoat layer arranged between the first pillar-shaped spacer and the first color filter is smaller than that arranged between the second pillar-shaped spacer and the second color filter.

In other embodiment, a liquid crystal display device includes: a first substrate including; a pixel electrode arranged in an active area to display an image in the first substrate, a seal area surrounding the active area, and a first pillar-shaped spacer arranged adjacent to the active area and second pillar-shaped spacer arranged adjacent to the seal area in an intermediate area located between the active area and the seal area, a second substrate including; a peripheral light shielding layer extending from the intermediate area to the seal area, a first color filter having two or more first color filter elements with a width and laminated on the peripheral light shielding layer right above the first pillar-shaped spacer in the shape of a belt or an island, a second color filter having two or more second color filter elements with an approximately same width as that of the first color filter elements, the second color filter being laminated on the peripheral light shielding layer right above the second pillar-shaped spacer in the shape of a belt or an island, wherein the interval between the adjacent second color filter elements of the second color filter is smaller than that between the adjacent first color filter elements, and an overcoat layer laminated on the first and second color filters, a seal material arranged on the seal area of the first substrate to attach the first and second substrates in the shape of a closed loop; and a liquid crystal layer held between the first and second substrates; wherein the thickness of the overcoat layer arranged between the first pillar-shaped spacer and the first color filter is smaller than that arranged between the second pillar-shaped spacer and the second color filter.

FIG. 1 is a plan view schematically showing the structure of a liquid crystal display device 1 according to an embodiment. The liquid crystal display device 1 includes an active-matrix type liquid crystal display panel LPN, a driver IC chip 2 and a flexible wiring substrate 3, etc. connected to the liquid crystal display panel LPN.

The liquid crystal display panel LPN includes an array substrate AR as a first substrate, a counter substrates CT as a second substrate facing the array substrate AR, and a liquid crystal layer (which is not illustrated) held between the array substrate AR and the counter substrates CT. The array substrate AR and counter substrates CT are attached together by a seal material SE. The liquid crystal layer is held in a cell gap formed between the array substrate AR and the counter substrate CT at the inner side surrounded by the seal material SE.

The liquid crystal display panel LPN includes an active area ACT of the shape of an approximately rectangle for displaying an image on the inner side surrounded by the seal material SE. The active area ACT is constituted by a plurality of pixels PX arranged in the shape of (m×n) matrix (here, m and n are positive integers). The driver IC chip 2 and the flexible wiring substrate 3 are mounted on the array substrate AR in a peripheral area PRP outside the active area ACT. The peripheral area PRP includes a seal area SA where the seal material SE is arranged, and an intermediate area MA located between the active area ACT and the seal area SA.

In this embodiment, the seal material SE is formed between the array substrate AR and the counter substrate CT in the shape of an approximately rectangular frame, while making a closed loop. That is, an injecting mouth for injecting a liquid crystal material into the gap between the array substrate AR and the counter substrate CT is not formed in the seal material SE. The seal material SE is formed of a UV curing material, et al. and is painted by a drawing method using a dispenser device or a screen printing method.

Figure 2:
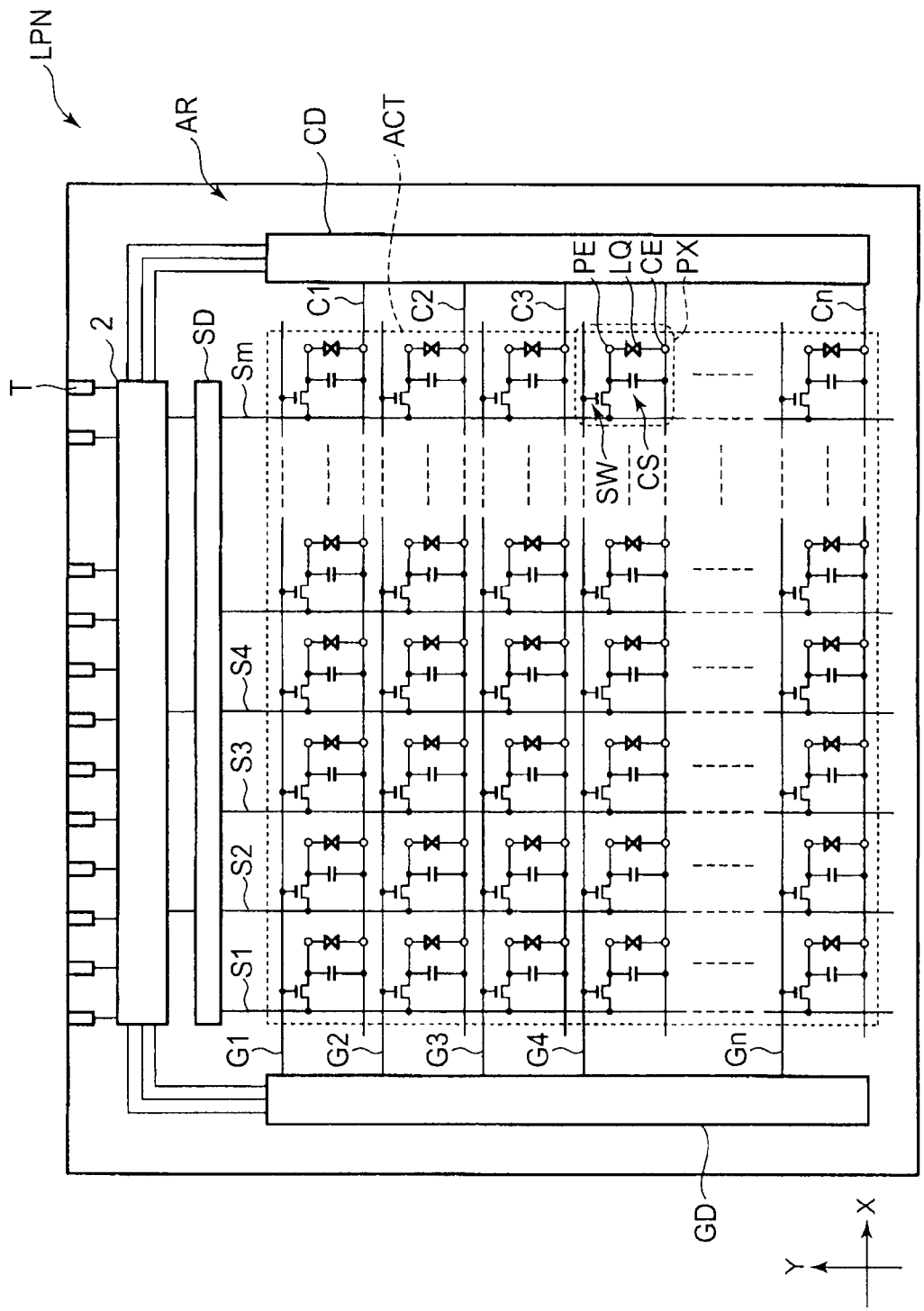
FIG. 2 is a figure schematically showing the composition and an equivalent circuit of the liquid crystal display panel shown in FIG. 1.

FIG. 2 is a figure schematically showing the composition and the equivalent circuit of the liquid crystal display device panel LPN shown in FIG. 1. Here, a composition of the liquid crystal display device using a lateral electric field (an electric field approximately parallel to the principal surface of the substrates) is explained. The array substrate AR of the liquid crystal display panel LPN is equipped with a pixel electrode PE and a counter electrode CE. The lateral electric field is formed between the pixel electrode PE and the counter electrode CE. That is, the composition of the Fringe Field Switching (FFS) mode is explained. The Fringe Field Switching (FFS) mode switches the liquid crystal molecule forming the liquid crystal layer LQ mainly using the lateral electric field. In addition, the composition of the liquid crystal display panel LPN is not limited to that explained here, and not only in the composition explained here, the counter electrode CE may be equipped at the counter substrate CT. Furthermore, TN (Twisted Nematic) mode, OCB (Optically Compensated Bend) mode and VA (Vertical Aligned) mode may be used, in which a vertical electric field is mainly used.

The array substrate AR includes n gate lines G (G1-Gn) and n capacitance lines C (C1-Cn) respectively extending in a X direction in the active area ACT, m source lines S (S1-Sm) respectively extending in a Y direction which crosses the X direction, (m×n) switching elements SW electrically connected with the gate lines G and the source lines S in each pixel PX, (m×n) pixel electrodes PE connected with the respective switching elements SW in each pixel PX, and the counter electrode CE opposing the pixel electrodes PE, which are portions of a capacitance line C. A retentive capacitance Cs is formed between the capacitance line C and the pixel electrode PE. The liquid crystal layer LQ is held between the pixel electrode PE and the counter electrode CE.

Each gate line G is pulled out to the outside of the active area ACT and is connected to a first driver circuit GD. Each source line S is pulled out to the outside of the active area ACT and is connected to a second driver circuit SD. Each capacitance line C is pulled out to the outside of the active area ACT and is connected to a third driver circuit CD. The first driver circuit GD, the second driver circuit SD, and the third driver circuit CD are formed on the array substrate AR and are connected with the driver IC chip 2.

In the illustrated example, the driver IC chip 2 is mounted on the array substrate AR in the outside of the active area ACT of the liquid crystal display panel LPN. In addition, though illustration of the flexible wiring substrate 3 is omitted, terminals T for connecting the flexible wiring substrate are formed at one edge of the array substrate AR. The terminals T are connected to the driver IC chip 2 through various lines.

Figure 3:
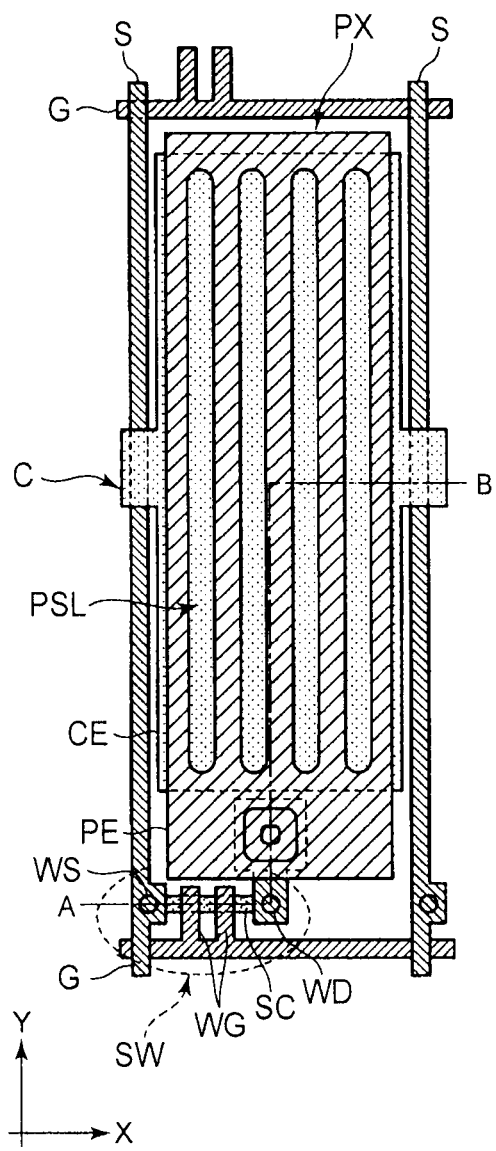
FIG. 3 is a plan view schematically showing the composition of a pixel in an array substrate shown in FIG. 2 looking from a counter substrate.

FIG. 3 is a plan view schematically showing the structure of a pixel in the array substrate AR shown in FIG. 2 looking from the counter substrate CT.

The gate line G extends in the X direction. The source line S extends in the Y direction. The switching element SW is arranged near an intersection portion of the gate line G and the source line S and is constituted by a thin film transistor (TFT). The switching element SW includes a semiconductor layer SC. The semiconductor layer SC is formed of poly-silicon, amorphous silicon, etc. In this embodiment, the semiconductor layer SC is formed of poly-silicon.

A gate electrode WG of the switching element SW is located above the semiconductor layer SC and is electrically connected with the gate line G (in the illustrated example, the gate electrode WG is integrally formed with the gate line G). A source electrode WS of the switching element SW is electrically connected with the source line S (in the illustrated example, the source electrode WS is integrally formed with the source line S). A drain electrode WD of the switching element SW is electrically connected with the pixel electrode PE.

The capacitance line C extends in the X direction. The capacitance line C includes the counter electrode CE formed so as to correspond to each pixel PX. The pixel electrode PE is arranged above the counter electrode CE. The pixel electrode PE is formed in the shape of an island corresponding to a pixel form, for example, an approximately quadrangle in the pixel PX. The pixel electrodes PE are respectively connected to a drain electrode WD of the switching element SW. A plurality of slits PSL is formed in the pixel electrode PE. In the illustrated example, the slits PSL extend in the direction Y.

Figure 4:
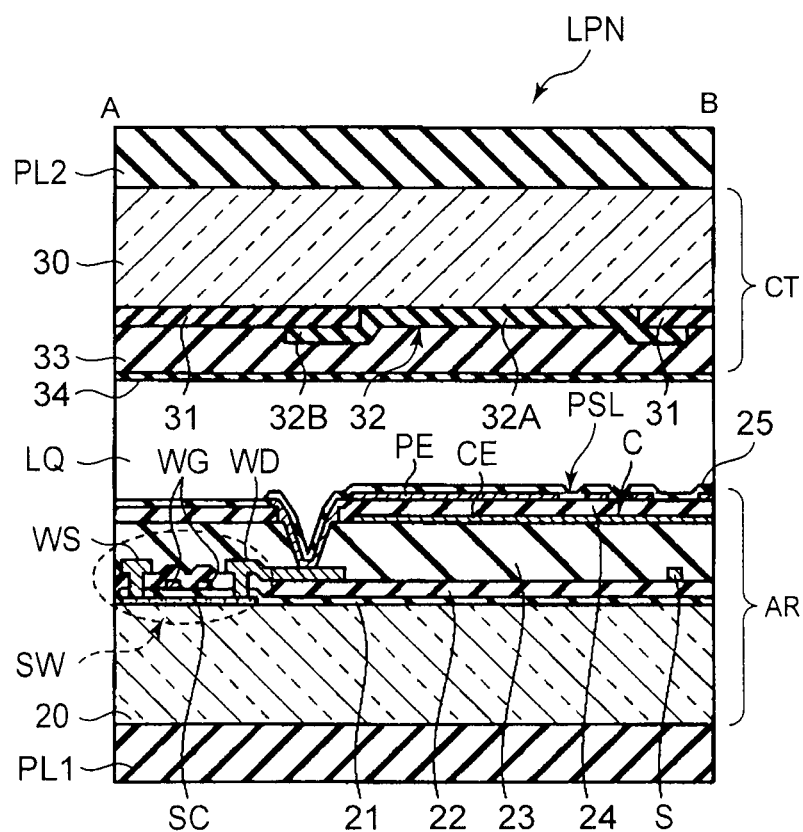
FIG. 4 is a cross-sectional view showing the liquid crystal display panel taken along line A-B in the pixel shown in FIG. 3.

FIG. 4 is a cross-sectional view showing the liquid crystal display panel taken along line A-B in the pixel shown in FIG. 3.

The array substrate AR is formed using an insulating transmissive substrate 20, such as a glass substrate, etc. The array substrate AR includes the switching element SW in an inside surface (namely, a face contacting with the liquid crystal layer LQ) of the insulating substrate 20. The switching element SW shown here is a thin film transistor of a top gate type. The semiconductor layer SC is arranged on the insulating substrate 20. The semiconductor layer SC is covered with a gate insulating film 21. Moreover, the gate insulating film 21 is arranged also on the insulating substrate 20. An undercoat layer may be arranged between the first insulating substrate 20 and the semiconductor layer SC.

The gate electrode WG of the switching element SW is arranged on the gate insulating film 21 and is located right above the semiconductor layer SC. The gate electrode WG is covered with a first interlayer insulating film 22. Moreover, the first interlayer insulating film 22 is arranged also on the gate insulating film 21. The gate insulating film 21 and the first interlayer insulating film 22 are formed, for example, of inorganic system materials, such as silicon nitride (SiN).

The source electrode WS and drain electrode WD of the switching element SW are arranged on the first interlayer insulating film 22. The source electrode WS and drain electrode WD are respectively in contact with the semiconductor layer SC through a contact hole which penetrates the gate insulating film 21 and the first interlayer insulating film 22. The source line S is also arranged on the first interlayer insulating film 22. The gate electrode WG, the source electrode WS, and the drain electrode WD are formed of electric conductive materials, such as molybdenum, aluminum, tungsten, and titanium.

The source electrode WS and drain electrode WD are covered with a second insulating film 23. Moreover, the second insulating film 23 is arranged also on the first interlayer insulating film 22. The capacitance line C including the counter electrode CE is arranged on a third interlayer insulating film 24. The third interlayer insulating film 24 is also arranged on the second insulating film 23

The pixel electrode PE is arranged on the third interlayer insulating film 24. The pixel electrode PE is connected to the drain electrode WD through a contact hole which penetrates the second interlayer insulating film 23 and third interlayer insulating film 24. Slits PSL opposing the counter electrode CE are formed in the pixel electrode PE.

The counter electrode CE, the capacitance line C and the pixel electrode PE are formed by a transmissive electric conductive material, for example, Indium Tin Oxide (ITO), Indium Zinc Oxide (IZO), etc. The pixel electrode PE is covered with a first alignment film 25. The first alignment film 25 is arranged on the surface of the array substrate AR which contacts with the liquid crystal layer LQ.

On the other hand, the counter substrate CT is formed using an insulating transmissive substrate 30, such as a glass substrate, etc. The counter substrate CT includes a black matrix 31 to lay out each pixel PX and a color filter 32 in an inside surface (namely, a surface contacting with the liquid crystal layer LQ) of the insulating substrate 30.

The black matrix 31 on the second insulating substrate 30 is arranged in the active area ACT. More specifically, the black matrix 31 is arranged so that the black matrix 31 opposes line portions, such as the gate lines G, the source lines S, and also the switching elements SW on the array substrate AR. The black matrix 31 is formed of a black colored resin or metal material having a light blocking characteristics, such as chromium (Cr), etc.

On the second insulating substrate 30, the color filter 32 is arranged in the active area ACT. More specifically, the color filter 32 has an effective portion 32A formed on the second insulating substrate 30, and a peripheral portion 32B laminated on the black matrix 31. The color filter 32 contains a red color filter arranged corresponding to a red pixel, a blue color filter arranged corresponding to a blue pixel, and a green color filter arranged corresponding to a green pixel. These red color filters, the blue color filter, and the green color filter are formed of resin materials colored in each color.

In the liquid crystal mode using the lateral electric field as mentioned-above, it is preferable that the surface contacting with the liquid crystal layer LQ of the counter substrate CT is formed flat, and the counter substrate CT further includes an overcoat layer 33 which makes the surface of the black matrix 31 and the color filter 32 smooth.

That is, the overcoat layer 33 extends on the black matrix 31 and the color filter 32. In the illustrated example, the overcoat layer 33 is arranged on the black matrix 31, the effective portion 32A of the color filter 32, and further on a peripheral portion 32B of the color filter 32 laminated on the black matrix 31.

In addition, the film thickness of the overcoat layer 33 on the black matrix 31 and the effective portion 32A is respectively thicker than the film thickness of the overcoat layer 33 on the peripheral portion 32B. The overcoat layer 33 is formed of, for example, a transparent resin material. The overcoat layer 33 is covered with a second alignment film 34. The second alignment film 34 is arranged on the surface of the counter substrate CT contacting with the liquid crystal layer LQ.

The first and second alignment films 25 and 34 are formed, for example, with polyimide. While a rubbing direction of the first alignment film 25 is in parallel with that of the second alignment film 34, the directions are opposite each other. For example, in case the rubbing direction of the first alignment film 25 is made into the direction slightly tilted by θ° to the Y direction, the second rubbing direction of the second alignment film 34 is parallel to the direction of (θ+180°).

The array substrate AR and counter substrate CT are arranged so that the first alignment film 25 and second alignment film 34 may face each other as mentioned-above. At this time, between the array substrate AR and counter substrate CT, a spacer (for example, pillar-shaped spacer formed on the array substrate AR with resin material, which is not illustrated), is arranged, and thereby, a predetermined cell gap is formed. The array substrate AR and counter substrate CT are pasted together by the seal material SE while the predetermined cell gap is formed.

The liquid crystal layer LQ is constituted by liquid crystal composite injected into the cell gap formed between the first alignment film 25 on the array substrate AR and the second alignment film 34 on the counter substrate CT.

A first polarizing plate PL1 is arranged at one external surface of the liquid crystal display panel LPN, i.e., the external surface of the first insulating substrate 20 which constitutes the array substrate AR. A first absorption axis of the first polarizing plate PL1 is parallel to the rubbing direction 6 of the first alignment film 25. Moreover, a second polarizing plate PL2 is arranged at another external surface of the liquid crystal display device panel LPN, i.e., the external surface of the second insulating substrate 30 which constitutes the counter substrate CT. The second absorption axis of the second polarizing plate PL2 crosses the first absorption axis at a right angle, and is parallel to the direction of (θ+90°).

In the liquid crystal display device of such composition, in an OFF state where the electric field is not impressed between the pixel electrode PE and the counter electrode CE, the alignment axis of the liquid crystal molecule aligned in a homogeneous alignment is in parallel to the first absorption axis of the first polarizing plate PL1, and intersects perpendicularly with the second absorption axis of the second polarizing plate PL2. In an OFF state, the light which penetrates the first polarizing plate PL1 is absorbed by the second polarizing plate PL2 after passing the liquid crystal display panel LPN. Consequently, a black image is displayed.

Moreover, in the ON state in which the electric field (fringe electric field) is formed between the pixel electrode PE and the counter electrode CE, some liquid crystal molecules are in response to the influence of electric field, and the alignment axis slightly shifts from the first absorption axis of the first polarizing plate PL1 and the second absorption axis of the second polarizing plate PL2, respectively. In the ON state, the light penetrating the first polarizing plate PL1 passes the second polarizing plate PL2 after passing the liquid crystal display panel LPN, thereby a white image is displayed. Accordingly, the normally black mode is realized.

According to this embodiment, the liquid crystal display panel LPN is formed using the ODF (One Drop Fill) method. That is, after forming the array substrate AR, for example, a closed loop-like seal material SE is formed on the array substrate AR, then a liquid crystal material is dropped in the inner side surrounded by the seal material SE, and the array substrate AR is pasted together with the counter substrate CT formed separately. Finally, the liquid crystal panel LPN is completed.

In the dropping method, the amount of the dropped liquid crystal material is approximately the same as the designed value of the capacity of the inner side surrounded by the seal material SE in the state where the predetermined cell gap is formed between the array substrate AR and the counter substrate CT. At this time, however, the amount of actually dropped liquid crystal material is tend to be set to slightly larger than the designed amount in order to prevent the fault on the display, such as air bubbles, etc. when the dropped amount of the liquid crystal material runs short. In this case, in the active area ACT, since the predetermined cell gap is formed between the array substrate AR and the counter substrate CT, excess liquid crystal material is accommodated in the intermediate area MA between the active area ACT and a seal area SA.

Figure 5:
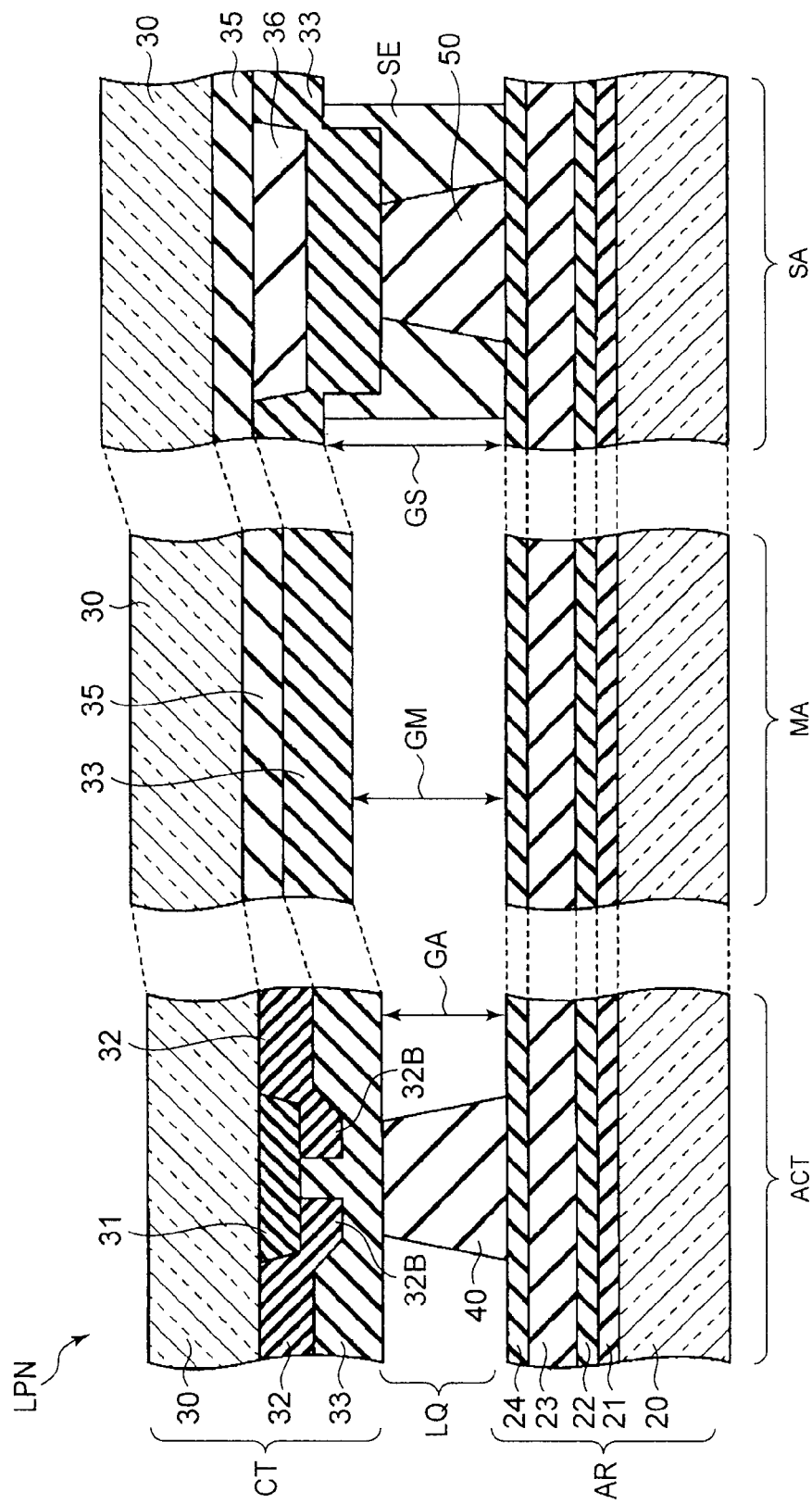
FIG. 5 is a cross-sectional view showing an active area, an intermediate area, and a seal area in the liquid crystal display panel.

FIG. 5 is a cross-sectional view showing the active area ACT, the intermediate area MA and the seal area SA in the liquid crystal display panel LPN. Only the composition necessary for explanation is illustrated here.

In the active area ACT, the array substrate AR is equipped with the pillar-shaped spacer 40 formed on the third interlayer insulating film 24. Between the first insulating substrate 20 and the third interlayer insulating film 24, the gate insulating film 21, the first interlayer insulating film 22, the second interlayer insulating film 23, etc. are arranged, and further wiring portions, which are not illustrated, such as the switching element SW, the gate wiring G and the source line S are arranged. That is, the spacer 40 is located above the wiring portions. Moreover, the spacer 40 is located between the first insulating substrate 20 and counter substrate CT.

On the other hand, a peripheral portion 32B of the color filter 32 is laminated on the black matrix 31 right above the spacer 40 in the counter substrate CT. The color filter 32 containing the peripheral portion 32B is covered with the overcoat layer 33. In addition, each peripheral portion 32B of the adjoining color filters 32 is not overlapped each other. In the illustrated example, the peripheral portion 32B of one color filter 32 is apart from the peripheral portion 32B of another color filter 32. That is, a portion of the black matrix 31 is covered with the overcoat layer 33 without being covered with the color filter 32. The black matrix 31, the peripheral portion 32B of the color filter 32, and the overcoat layer 33 are laminated between the spacer 40 and the second insulating substrate 30.

In the active area ACT, the predetermined cell gap GA is formed between the array substrate AR and the counter substrate CT by such composition. In addition, although not illustrated, the first and second alignment films are laminated between the spacer 40 and the overcoat layer 33.

The array substrate AR includes a pillar-shaped peripheral spacer 50 formed on the third interlayer insulating film 24 in the seal area SA. The peripheral spacer 50 is formed by the same material as the spacer 40, for example, resin material. In addition, the height of the peripheral spacer 50 is approximately the same as that of the spacer 40.

On the other hand, the counter substrate CT includes a peripheral light shielding layer 35 formed on the second insulating substrate 30 and a spacer seat layer 36 formed on the peripheral light shielding layer 35.

The peripheral light shielding layer 35 successively extends from the intermediate area MA to the seal area SA, for example. The peripheral light shielding layer 35 is formed of the same material as the black matrix 31. In addition, the film thickness of the peripheral light shielding layer 35 is approximately the same as that of the black matrix 31.

The spacer seat layer 36 is laminated on the peripheral light shielding layer 35 right above the peripheral spacer 50. The spacer seat layer 36 is formed of the same material as the blue color filter of the color filters 32. In addition, the film thickness of the spacer seat layer 36 is approximately the same as the effective portion 32A of the color filter 32, while may be thicker than the film thickness of the peripheral portion 32B.

The overcoat layer 33 successively extends to the intermediate area MA and seal area SA from the active area ACT. That is, the overcoat layer 33 is arranged between the peripheral spacer 50 and spacer seat layer 36. While the film thickness of the overcoat layer 33 is uniform where the ground layer is flat, the film thickness of the overcoat layer 33 may becomes thin locally in the portion where the ground has unevenness. For example, the film thickness of the overcoat layer 33 arranged between the spacer 40 and peripheral portions 32B of the color filter 32 in the active area ACT is thinner than that between the peripheral spacer 50 and spacer seat layer 36.

That is, a total thickness of the black matrix 31, the peripheral portion 32B, and the overcoat layer 33 arranged between the second insulating substrate 30 and the spacer 40 is thinner than the total thickness of the peripheral light shielding layer 35, the spacer seat layer 36, and the overcoat layer 33 formed between the second insulating substrate 30 and the peripheral spacer 50. In the liquid crystal display panel LPN with 3.5 type active area ACT, as an example, the difference between the total thickness of the black matrix 31, the peripheral portion 32B and the overcoat layer 33 formed between the second insulating substrate 30 and the spacer 40, and the total thickness of the peripheral light shielding layer 35, the spacer seat layer 36 and the overcoat layer 33 formed between the second insulating substrate 30 and the peripheral spacer 50 is about 0.2 μm-0.6 μm.

For this reason, in the seal area SA, the cell gap GS larger than the cell gap GA of the active area ACT is formed between the array substrate AR and counter substrate CT. In addition, the seal material SE is arranged at the seal area SA.

In the example shown in FIG. 5, the spacer is not arranged at the intermediate area MA. Since the active area ACT and the seal area SA are configured as above, the cell gap GM in the intermediate area MA is larger than the cell gap GA in the active area ACT, and smaller than the cell gap GS of the seal area SA. In the intermediate area MA, it is possible to accommodate excess liquid crystal materials of the dropped crystal materials in the manufacturing process of the liquid crystal display panel LPN. In addition, even if the excess liquid crystal material is accommodated, and the cell gap GM becomes larger than the predetermined cell gap GA, a poor display is not sighted because the intermediate area MA is shielded by the peripheral light shielding layer 35 and does not contribute to the display.

By the way, in the liquid crystal display panel LPN configured as shown in FIG. 5, if pressure is applied to the active area ACT, stress is easily concentrated to the intermediate area MA where the spacer is not arranged, and the cell gap GM in the intermediate area MA changes sharply. When the change of the cell gap GM is transmitted to the active area ACT, for example, an optical change (for example, change of retardation value) occurs in the adjacent area to the intermediate area MA in the active area ACT, and a phenomenon (pooling) in which a screen is observed by waving occurs.

In the display mode using the lateral electric field as described-above, as compared with the display mode using the vertical electric field, a regulation strength to make the alignment of the liquid crystal molecules by the first and second alignment films 25 and 34 is weak, and the retardation value easily changes with external stress. Moreover, in the normally black mode, if the retardation value changes a lot, the polling will be easily sighted in the case of the black image display.

Figure 6:
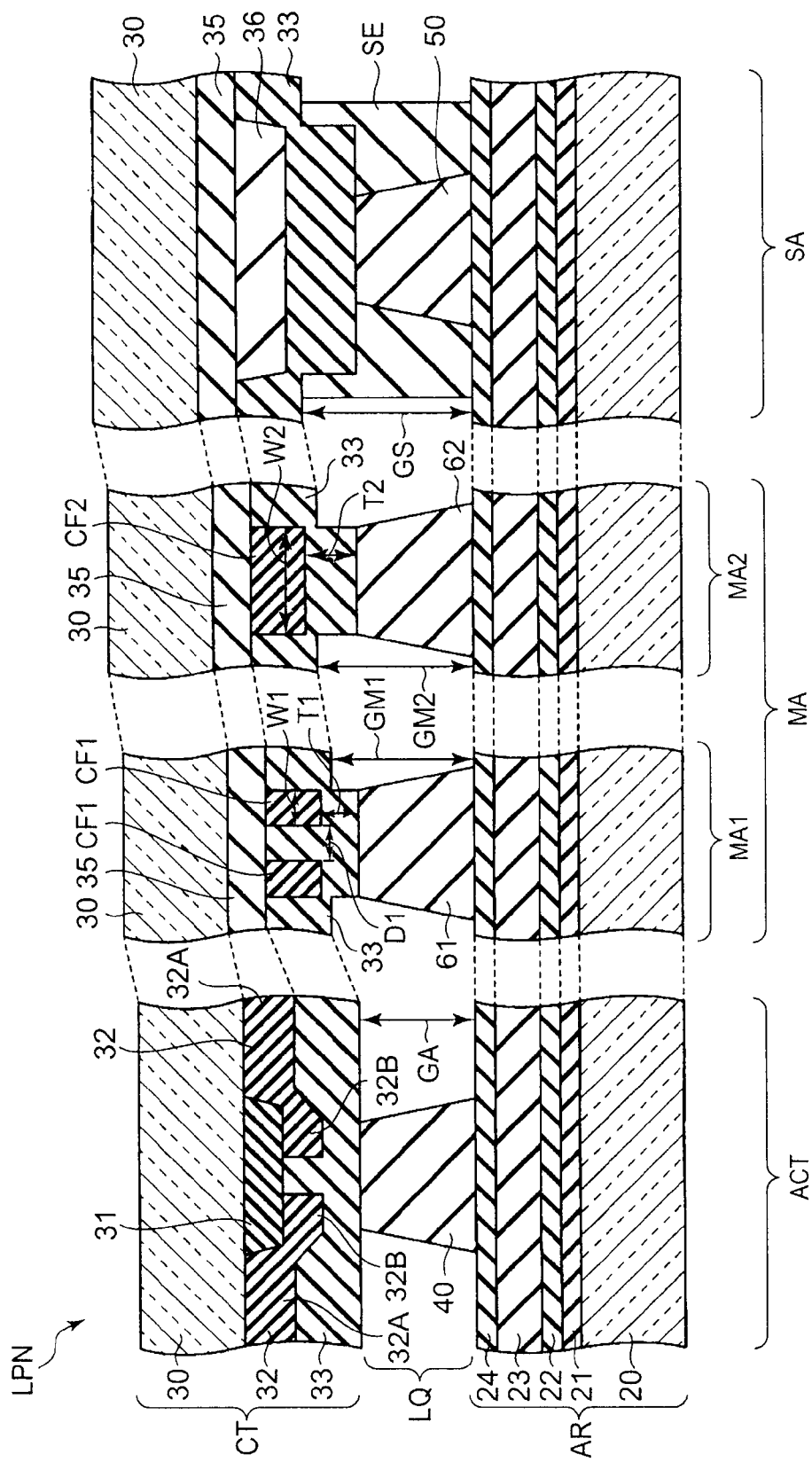
FIG. 6 is a cross-sectional view schematically showing an active area, an intermediate area, and a seal area in the liquid crystal display panel according to the embodiment.

FIG. 6 is a cross-sectional view showing the active area ACT, the intermediate area MA, and the seal area SA in the liquid crystal display panel LPN according to the embodiment. Only the composition necessary for explanation is shown, and since the composition of the active area ACT and the seal area SA is the same as that of the example shown in FIG. 5, the same referential mark or symbol is attached, and detailed explanation is omitted here.

In this embodiment, the array substrate AR includes a first pillar-shaped spacer 61 in a first region MA1 adjacent to the active area ACT and a second pillar-shaped spacer 62 in a second region MA2 adjacent to the seal area SA in the intermediate area MA. The first and second pillar shaped spacers 61 and 62 are formed on the third interlayer insulating film 24.

As well as the example shown in FIG. 5, the array substrate AR includes the spacer 40 formed on the third interlayer insulating film 24 in the active area ACT, and the peripheral spacer 50 formed on the third interlayer insulating film 24 in the seal area SA. The first and second pillar-shaped spacers 61 and 62 are formed by the same material as the spacer 40 and the peripheral spacer 50, for example, the resin material. The height of the first and second pillar-shaped spacers 61 and 62 is approximately the same as the height of the spacer 40 and the peripheral spacer 50.

The counter substrate CT includes the peripheral light shielding layer 35 formed on the second insulating substrate 30, a first color filter CF1 and a second color filter CF2 formed on the peripheral light shielding layer 35, and the overcoat layer 33 laminated on the first color filter CF1 and second color filter CF2 in the intermediate area MA.

The peripheral light shielding layer 35 extends from the intermediate area MA to the seal area SA as above-mentioned. The peripheral light shielding layer 35 is formed of the same material as the black matrix 31. The film thickness of the peripheral light shielding layer 35 is approximately the same as that of the black matrix 31.

The first color filter (dummy color filter layer) CF1 is arranged in the first region MA1 in the intermediate area MA. The first color filter CF1 is laminated on the peripheral light shielding layer 35 right above the first pillar-shaped spacer 61. The first color filter CF1 has a first width W1. In the illustrated example, two color filter elements CF1 with an interval D1 therebetween, are arranged adjacently each other right above the first pillar-shaped spacer 61.

The second color filter (dummy color filter layer) CF2 is arranged in the second region MA2 in the intermediate area MA. The second color filter CF2 is laminated on the peripheral light shielding layer 35 right above the second pillar-shaped spacer 62. The second color filter CF2 has a second width W2 different from the first width W1. In the illustrated example, single color filter CF2 is arranged right above the second pillar-shaped spacer 62. The second width W2 is larger than the first width W1.

The first color filter CF1 and second color filter CF2 are formed of the same material as the blue color filter of the color filter 32 arranged in the active area ACT. The film thickness of the first color filter CF1 and second color filter CF2 is approximately the same as that of effective portion 32A of the color filter 32.

The overcoat layer 33 extends from the active area ACT to the intermediate area MA, and further to the seal area SA as above-mentioned. That is, the overcoat layer 33 is arranged between the first pillar-shaped spacer 61 and the first color filter CF1, and between the second pillar-shaped spacer 62 and the second color filter CF2, respectively. The film thickness T1 of the overcoat layer 33 arranged between the first pillar-shaped spacer 61 and the first color filter CF1 is thinner than the thickness T2 of the overcoat layer 33 arranged between the second pillar-shaped spacer 62 and the second color filter CF2.

That is, the total thickness of the peripheral light shielding layer 35, the first color filter CF1, and the overcoat layer 33 respectively formed between the second insulating substrate 30 and the first pillar-shaped spacer 61, is thinner than the total thickness of the peripheral light shielding layer 35, the second color filter CF2, and the overcoat layer 33 respectively formed between the second insulating substrate 30 and the second pillar-shaped spacer 62. For this reason, in the intermediate area MA, while a cell gap GM1 is formed in the first region MA1 adjacent to the active area ACT, a cell gap GM2 larger than the cell gap GM1 is formed in the second region MA2 adjacent to the seal area SA. In addition, the cell gap GM1 in the region MA1 is approximately same or larger than the cell gap GA in the active area ACT, and the cell gap GM2 in the region MA2 is approximately same or smaller than the cell gap GS of the seal area SA.

According to above configuration, while the predetermined cell gap GA is formed in the active area ACT, the cell gap is gradually expanded as it goes to the seal area SA from the active area ACT. In the intermediate area MA, the first and second pillar-shaped spacers 61 and 62 are arranged, and each cell gap is maintained.

Accordingly, even if pressure is applied to the active area ACT from exterior, it becomes possible to control the change of the cell gap like a wave in the intermediate area MA. Therefore, the generation of the polling in the active area ACT can be suppressed, and it becomes possible to provide a high quality liquid crystal display device.

Figure 7:
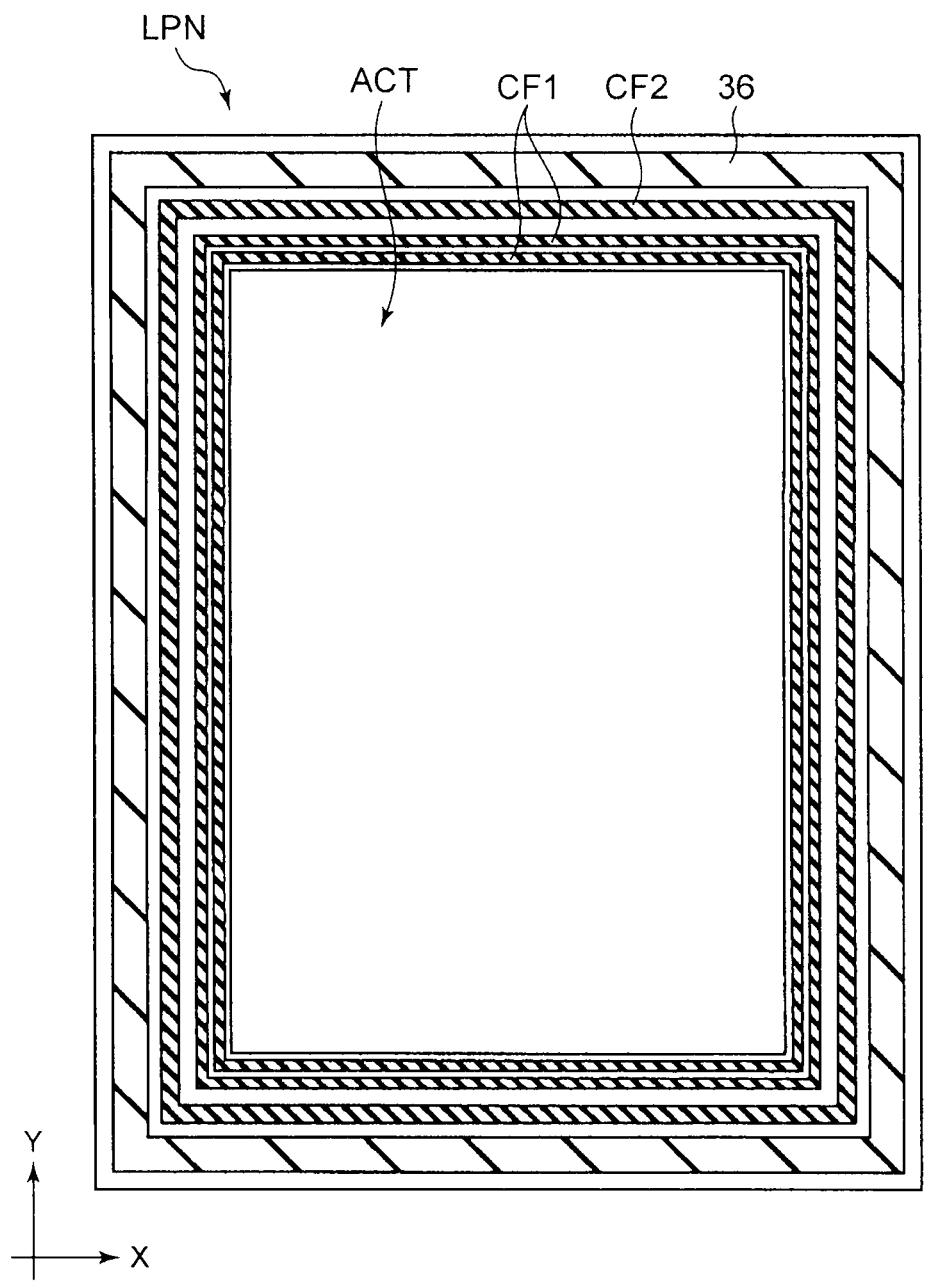
FIG. 7 is a figure showing an example of a layout of a first color filter, a second color filter, and a spacer seat layer in the liquid crystal display panel according to the embodiment.

FIG. 7 is a figure showing an example of a layout of the first color filter, the second color filter, and the spacer seat layer in the liquid crystal display panel according to the embodiment. The number of the first color filter CF1, the second color filter CF2, and the spacer seat layer 36 is not limited to the illustrated example.

In this embodiment, all of the first color filter CF1, the second color filter CF2, and spacer seat layer 36 are formed in belt-like. The first color filter CF1 extends in the X direction and Y direction respectively, namely, is formed in the shape of approximately rectangular frame surrounding the active area ACT. Similarly, the second color filter CF2 extends in the X direction and Y direction respectively, and is formed in the shape of approximately rectangular frame surrounding the outer peripheral of the first color filter CF1. The seat layer 36 also extends in the X direction and Y direction respectively, and is formed in the shape of approximately rectangular frame surrounding the outer peripheral of the second color filter CF2.

Figure 8:
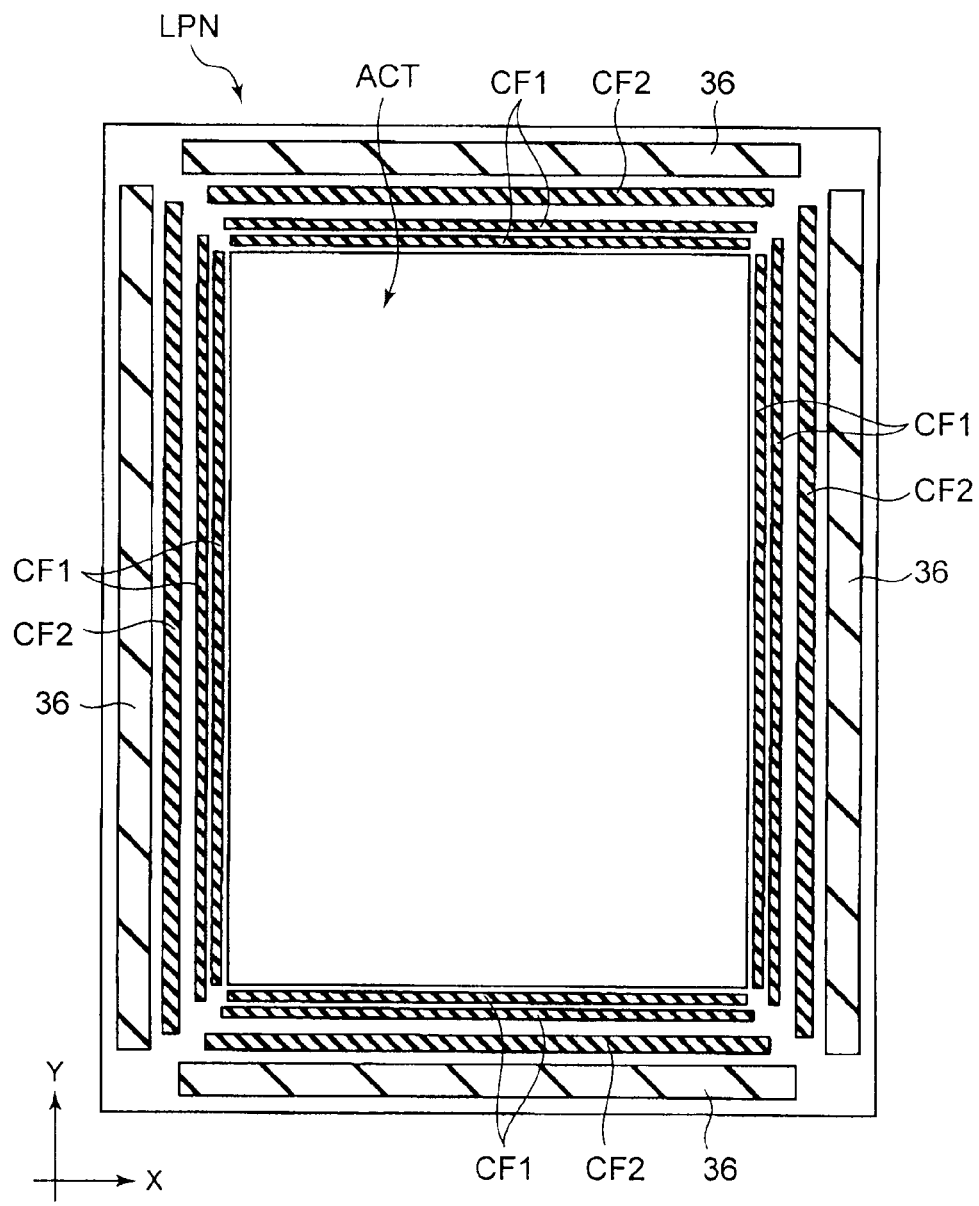
FIG. 8 is a figure showing other example of the layout of the first color filter, the second color filter, and the spacer seat layer in the liquid crystal display panel according to the embodiment.

FIG. 8 is a figure showing other example of the layout of the first color filter CF1, the second color filter CF2, and the spacer seat layer 36 in the liquid crystal display panel LPN according to the embodiment.

In this example, all of the first color filter CF1, the second color filter CF2, and the spacer seat layer 36 are formed in belt-like. The example shown in FIG. 8 is different in that circumferences of respective angle portions of the first color filter CF1, the second color filter CF2, and the spacer seat layer 36 are missing as compared with the example shown in FIG. 7.

That is, the first color filter CF1 extends in the X direction and Y direction and consists of four segments formed in the shape of a straight line in the outside of the active area ACT in the shape of a rectangle. The second color filter CF2 also extends in the X direction and Y direction and consists of four segments formed in the shape of a straight line in the outside of the first color filter CF1. Similarly, the spacer seat layer 36 extends in the X direction and Y direction and consists of four segments formed in the shape of a straight line in the outside of the second color filter CF2, respectively.

Figure 9:
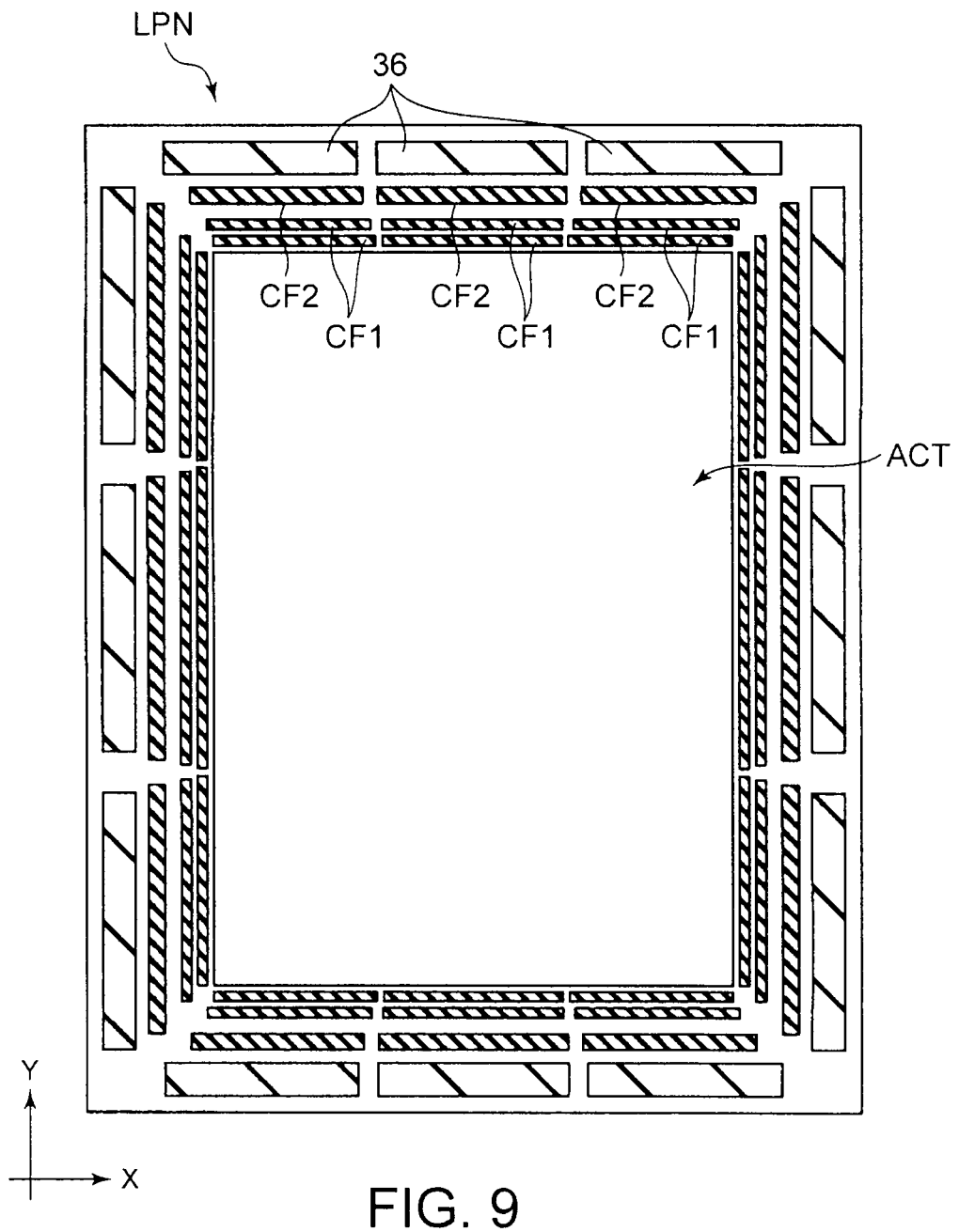
FIG. 9 is a figure showing other example of the layout of the first color filter, the second color filter, and the spacer seat layer in the liquid crystal display panel according to the embodiment.

FIG. 9 is a figure showing other example of the layout of the first color filter CF1, the second color filter CF2, and the spacer seat layer 36 in the liquid crystal display panel LPN according to the embodiment.

In this example shown in the figure, the first color filter CF1, the second color filter CF2, and the spacer seat layer 36 are respectively formed in the shape of an island. In the example shown in FIG. 9, three islands in one segment of the color filters F1 and F2, and spacer seat layer 36 are used respectively. However, the number of the islands is not limited to three, but may use any plural number.

Figure 10:
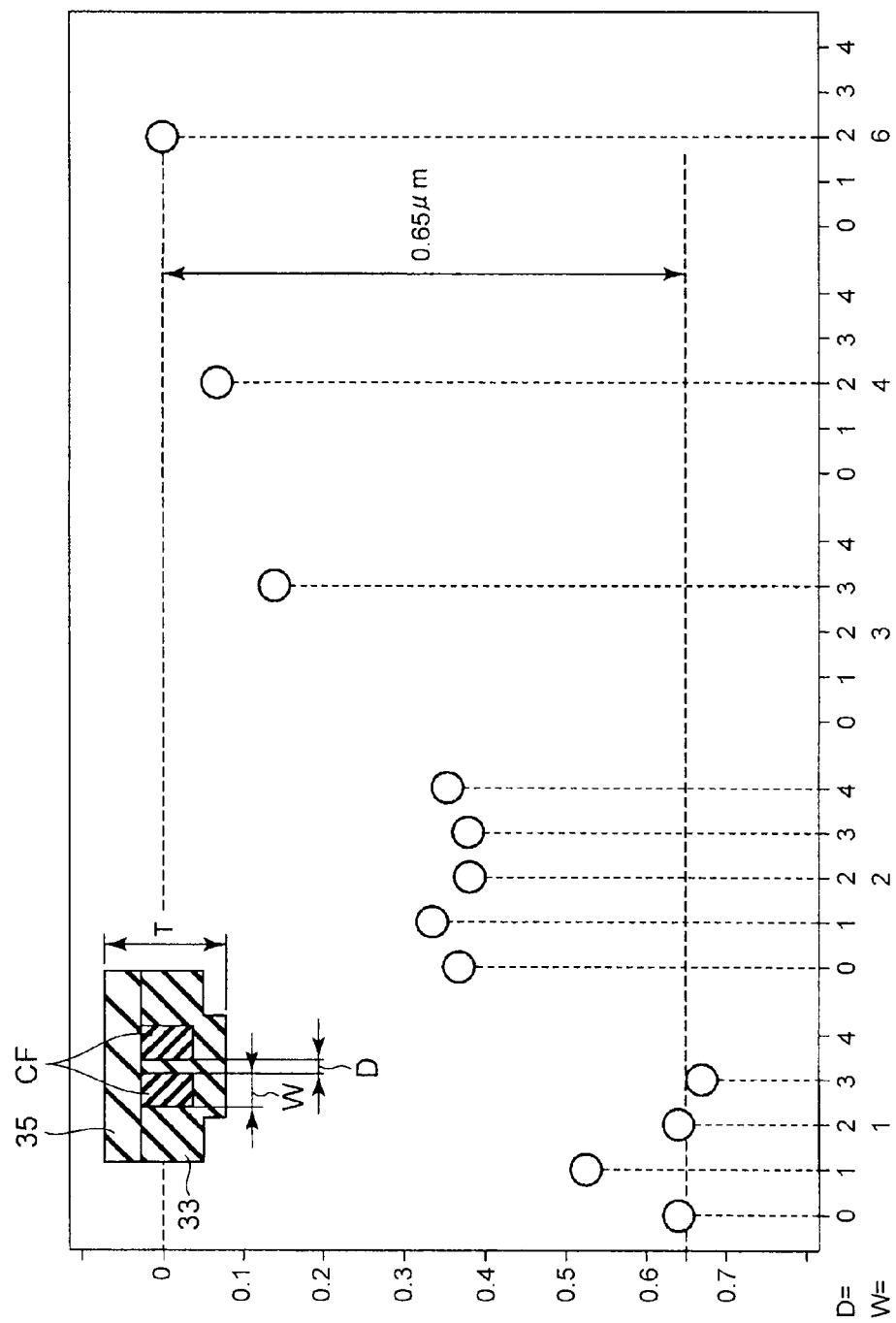
FIG. 10 is a figure for explaining a relation between the thickness of an overcoat layer and the form of a ground layer on which the overcoat layer is formed.

Next, a relation of the total film thickness of the peripheral light shielding layer 35, the dummy color filter composed of the first color filter CF1 and the second color filter CF2 and the overcoat layer 33 arranged between the second insulating substrate 30 and the first and second pillar-shaped spacers 61 and 62, with the width W of the dummy color filter CF and the interval D between the dummy color filters CF is reviewed. FIG. 10 is a figure showing the result of the review.

Here, with reference to the width W of the dummy color filter CF, samples having the width W of once (W=1) as many as a reference value, twice (W=2), 3 times (W=3), 4 times (W=4) and 6 times (W=6), that is, five samples were prepared. Moreover, with reference to the interval D between the dummy color filters CF, the sample of zero (D=0) (that is, dummy color filter CF is formed of single one), once (D=1) as many as a reference value, twice (D=2), 3 times (D=3), and 4 times (D=4), that is, five samples were prepared.

Regarding the total film thickness T, the value in the case of W=6 and D=2 is presumed as a reference value (0). In the case of W=4 and D=2, the value decreases by about 0.04 µm than the reference value, in the case of W=3 and D=3, the value decreases by about 0.15 µm than the reference value, in the case of W=2 and D=0, 1, 2, 3, or 4, the value decreases by 0.3 µm to 0.4 µm than the reference value, and in the case of W=1 and D=0, 1, 2, 3, or 4, the value decreases by 0.5 µm to 0.65 µm than the reference value.

The difference of the total film thickness T mainly originates in the difference of the film thickness of the overcoat layer 33 which overlaps with the dummy color filter CF. That is, the leveling nature changes with the width W and the interval D of the dummy color filters CF in which the dummy color filters CF serve as the ground for the overcoat layer 33. As a consequence, the film thickness of the overcoat layer 33 laminated on the dummy color filter CF becomes thinner as the area of the dummy color filter CF used as the ground of the overcoat layer 33 becomes smaller. Moreover, the film thickness of the overcoat layer 33 laminated on the dummy color filter CF becomes thinner as the interval between the dummy color filters CF used as the ground of the overcoat layer 33 becomes larger.

In this embodiment, such a film thickness difference of the overcoat layer 33 is used, and it was confirmed that the total film thickness T can be controlled by the width W of the dummy color filter CF and the interval D between the dummy color filters CF. In the example shown here, it was confirmed that the thickness can be controlled in the range up to 0.65 µm.

Figure 11:
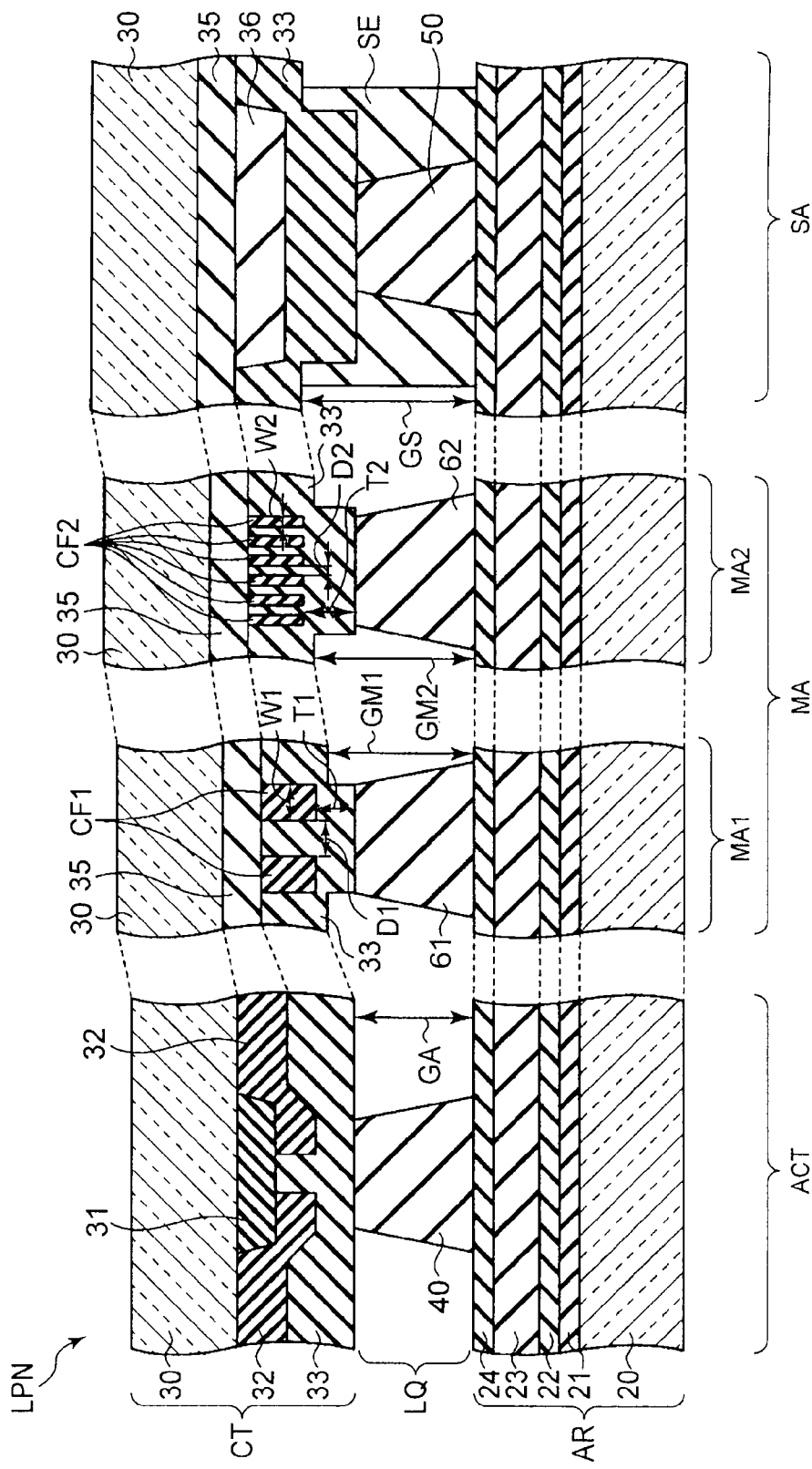
FIG. 11 is a cross-sectional view showing the active area, the intermediate area, and the seal area in the liquid crystal display panel according to other embodiment.

Next, other examples of the composition are explained. FIG. 11 is a cross-sectional view showing the active area ACT, the intermediate area MA, and the seal area SA in the liquid crystal display panel LPN according to other embodiment. In addition, here only composition necessary for explanation is shown, and since the composition of the active area ACT and the seal area SA is the same as that of the example shown in FIG. 5, the same referential mark or symbol is attached, and detailed explanation is omitted here.

The composition shown in FIG. 11 is different in that the second width W2 of the second color filter CF2 is smaller than the first width W1 of the first color filter CF1 comparing with the example of the composition shown in FIG. 6.

That is, in the intermediate area MA, the array substrate AR includes the first pillar-shaped spacer 61 arranged in the first region MA1 and the second pillar-shaped spacer 62 arranged in the region MA2. The counter substrate CT includes the peripheral light shielding layer 35 formed on the second insulating substrate 30, the first color filter CF1 and the second color filter CF2 laminated on the peripheral light shielding layer 35, and the overcoat layer 33 laminated on the first and second color filters CF1 and CF2.

The first color filter CF1 is arranged in the first region MA1 in the intermediate area MA. The first color filter CF1 is laminated on the peripheral light shielding layer 35 right above the first pillar-shaped spacer 61 formed on the array substrate AR. In the illustrated example, a pair of color filters CF1 with a first width W1 is arranged adjacently each other right above the first pillar-shaped spacer 61 at an interval D1.

The second color filter CF2 is arranged in the second region MA2 in the intermediate area MA. The second color filter CF2 is laminated on the peripheral light shielding layer 35 above the second pillar-shaped spacer 62 formed on the array substrate AR. In the illustrated example, six second color filter elements CF2 with a second width W2 are arranged adjacently each other right above the second pillar-shaped spacer 62 at an interval D2, respectively. The interval D2 between the adjacent second color filter elements CF2 is smaller than the interval D1 between the adjacent first color filter elements CF1. That is, the second color filter elements CF2 are arranged more densely than the first color filter elements CF1.

The overcoat layer 33 is arranged between the first pillar-shaped spacer 61 and the first color filter CF1, and between the second pillar-shaped spacer 62 and second color filter CF2, respectively. The film thickness of the overcoat layer 33 laminated on the first color filter CF1 tends to become thinner because the first color filter elements CF1 are arranged comparatively in a sparse state. On the other hand, the film thickness of the overcoat layer 33 laminated on the second color filter CF2 tends to become thicker because the second color filter elements CF2 are arranged comparably in a dense state. That is, the film thickness T2 of the overcoat layer 33 between the second pillar-shaped spacer 62 and second color filter CF2 is larger than the film thickness T1 of the overcoat layer 33 between the first pillar-shaped spacer 61 and first color filter CF1.

Therefore, the relation among the cell gap GA in the active area ACT, the cell gap GM1 in the first region MA1 in the intermediate area MA, the cell gap GM2 in the second region MA2 in the intermediate area MA and the cell gap GS in the seal area SA becomes as follows as well as the example shown in FIG. 6.

$$GA \leq GM1 < GM2 \leq GS$$

According to such composition, the same effect as the example shown in FIG. 6 is acquired.

Figure 12:
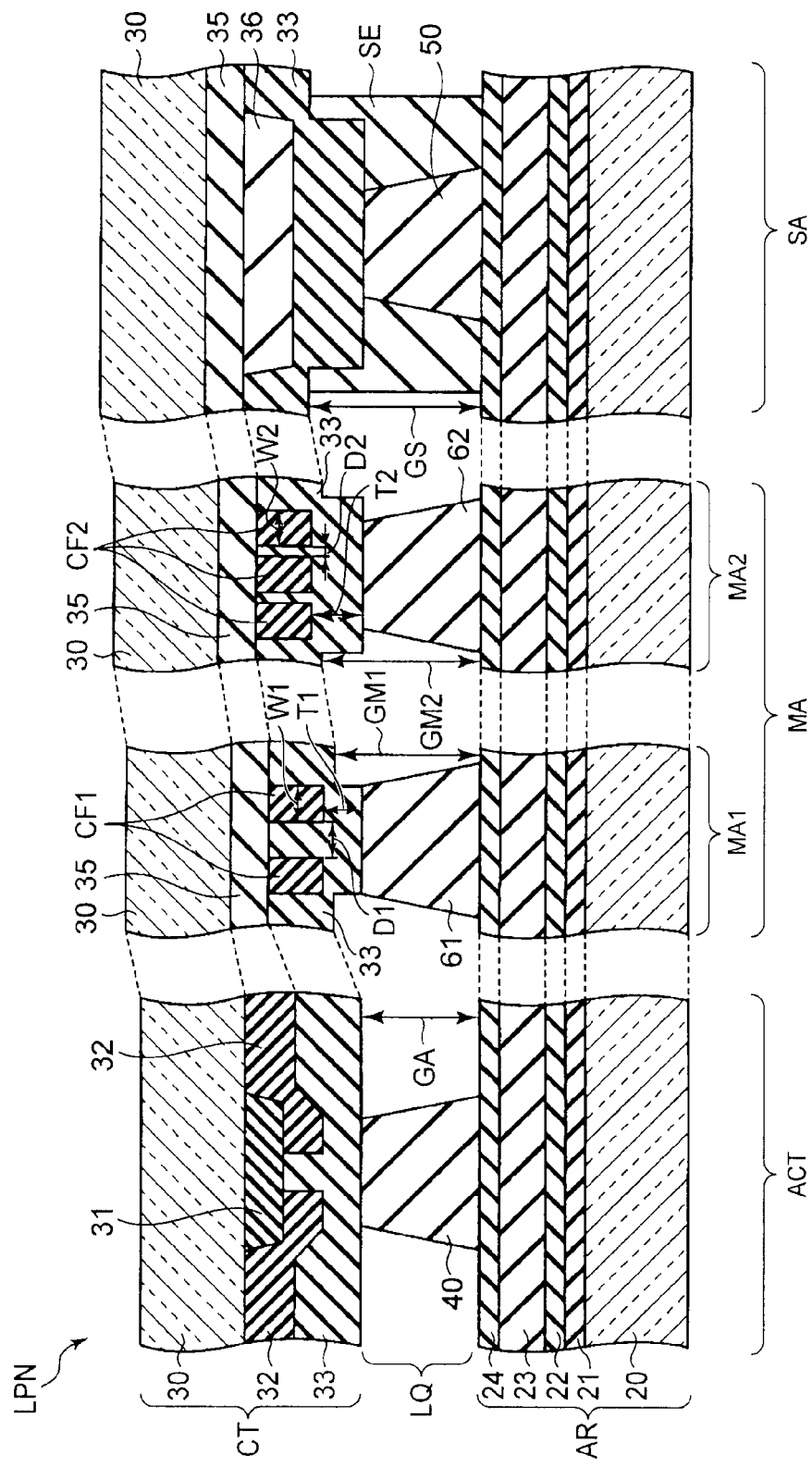
FIG. 12 is a cross-sectional view showing the active area, the intermediate area, and the seal area in the liquid crystal display panel according to other embodiment.

FIG. 12 is a cross-sectional view showing the active area ACT, the intermediate area MA, and the seal area SA in the liquid crystal display panel LPN according to other embodiment. In addition, here only composition necessary for explanation is shown, and since the composition of the active area ACT and the seal area SA is the same as that of the example shown in FIG. 6, the same referential mark or symbol is attached and detailed explanation is omitted here.

The example of the composition shown in FIG. 12 is different from the composition shown in FIG. 11 in that the first width W1 of the first color filter CF1 is the same as the second width W2 of the second color filter CF2. That is, in the intermediate area MA, the array substrate AR includes the first pillar-shaped spacer 61 arranged in the first region MA1 and the second pillar-shaped spacer 62 in the second region MA2. The counter substrate CT includes the peripheral light shielding layer 35 formed on the second insulating substrate 30, the first color filter CF1 and the second color filter CF2 laminated on the peripheral light shielding layer 35, and overcoat layer 33 laminated on the first color filter CF1 and the second color filter CF2.

The first color filter CF1 is arranged in the first region MA1 of the intermediate area MA. The first color filter CF1 is laminated on the peripheral light shielding layer 35 right above the first pillar-shaped spacer 61 formed on the array substrate AR. In the illustrated example, two first color filter elements CF1 respectively having the first width W1 are arranged adjacently each other at the interval D1.

The second color filter CF2 is arranged in the second region MA2 of the intermediate area MA. The second color filter CF2 is laminated on the peripheral light shielding layer 35 right above the second pillar-shaped spacer 62 formed on the array substrate AR. In the illustrated example, three first color filter elements CF2 respectively having the second width W2 are arranged adjacently each other at the interval D2. The interval D2 between the second color filter elements CF2 is smaller than the interval D1 between the first color filter elements CF1. That is, the second color filters elements CF2 are arranged more densely than the first color filters CF1.

The first color filter CF1 and the second color filter CF2 are formed of the same material as the blue color filter of the color filter 32 arranged in the active area ACT.

The overcoat layer 33 is arranged between the first pillar-shaped spacer 61 and the first color filter CF1, and between the second pillar-shaped spacer 62 and the second color filter CF2, respectively. The film thickness T2 of the overcoat layer 33 between the second pillar-shaped spacer 62 and the second color filter CF2 is larger than the film thickness T1 of the overcoat layer 33 between the first pillar-shaped spacer 61 and the first color filter CF1 as well as the embodiment shown in FIG. 11.

Therefore, the relation among the cell gap GA in the active area ACT, the cell gap GM1 in the first region MA1 in the intermediate area MA, the cell gap GM2 in the second region MA2 in the intermediate area MA and the cell gap GS in the seal area SA becomes as follows as well as the example shown in FIG. 6.

$$GA \leq GM1 < GM2 \leq GS$$

According to such composition, the same effect as the example shown in FIG. 6 is acquired.

Figure 13:
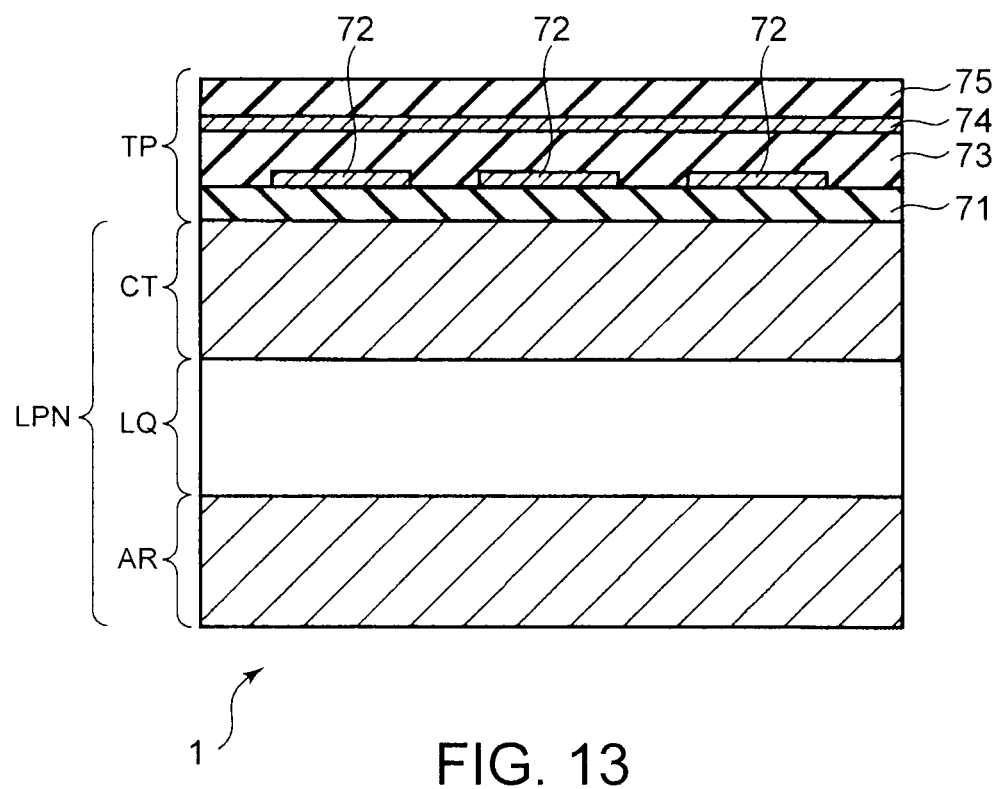
FIG. 13 is a figure schematically showing other example of the composition of the liquid crystal display device according to the embodiment.

Next, a liquid crystal display device equipped with a touch panel TP is explained as other embodiment. FIG. 13 is a figure schematically showing the composition of the liquid crystal display device according to this embodiment.

The illustrated liquid crystal display device 1 is equipped with a touch panel TP on the counter substrate CT which constitutes the liquid crystal display device panel LPN. Although various forms are applicable to the composition of the touch panel TP, one example is explained here.

Namely, the touch panel TP includes a first support substrate 71 arranged on the external surface of the counter substrate CT, first a sensing electrode 72 arranged on the first support substrate 71, a dielectric layer 73 arranged on the first sensing electrode 72, a second sensing electrode 74 arranged on the dielectric layer 73, and a second support substrate 75 arranged on the second sensing electrode 74.

The first support substrate 71 and the second support substrate 75 are formed of a resin substrate, respectively. For example, the first sensing electrode 72 is supported by the first support substrate 71, and is formed in the shape of a stripe. The second sensing electrode 74 is supported by the second support substrate 75, and is formed in the shape of a stripe. The first sensing electrode 72 and the second sensing electrode 74 face each other through the dielectric layer 73 so that they cross perpendicularly each other. The first sensing electrode 72 and second sensing electrode 74 are formed of transmissive electric conductive material, such as ITO and IZO. In the touch panel TP of such composition, contact or touch by human is detectable according to change of a capacitance between the first sensing electrode 72 and second sensing electrode 74.

In the liquid crystal display device 1 equipped with such a touch panel TP, external force is easily applied to the liquid crystal display panel LPN through the touch panel TP. Accordingly, it is very effective to apply the composition of this embodiment in order to suppress the generation of the polling.

As explained above, according to this embodiment, a high quality liquid crystal display can be provided.

While certain embodiments have been described, these embodiments have been presented by way of example only, and are not intended to limit the scope of the inventions. In practice, the structural and method elements can be modified without departing from the spirit of the invention. Various embodiments can be made by properly combining the structural and method elements disclosed in the embodiments. For example, some structural and method elements may be omitted from all the structural and method elements disclosed in the embodiments. Furthermore, the structural and method elements in different embodiments may properly be combined. The accompanying claims and their equivalents are intended to cover such forms or modifications as would fall with the scope and spirit of the inventions.

What is claimed is:

1. A liquid crystal display device, comprising:
a first substrate including;
   a pixel electrode arranged in an active area to display an image in the first substrate,
   a seal area surrounding the active area, and
   a first pillar-shaped spacer arranged adjacent to the active area and a second pillar-shaped spacer arranged adjacent to the seal area in an intermediate area located between the active area and the seal area,
a second substrate including;
   a peripheral light shielding layer extending from the intermediate area to the seal area,
   a first color filter of a first width laminated on the peripheral light shielding layer right above the first pillar-shaped spacer in the shape of a belt or an island,
   a second color filter of a second width different from the first width, the second color filter being laminated on the peripheral light shielding layer right above the second pillar-shaped spacer in the shape of a belt or an island, and
   an overcoat layer laminated on the first and second color filters,
a seal material arranged on the seal area of the first substrate to attach the first and second substrates in the shape of a closed loop; and
a liquid crystal layer held between the first and second substrates;
wherein the thickness of the overcoat layer arranged between the first pillar-shaped spacer and the first color filter is smaller than that arranged between the second pillar-shaped spacer and the second color filter.

2. The liquid crystal display device according to claim 1, wherein the first width of the first color filter is smaller than the second width of the second color filter.

3. The liquid crystal display device according to claim 1, wherein the respective first and second color filters are formed of two or more color filter elements, and the second width of the second color filter elements is smaller than the first width of the first color filter elements, and the interval between the adjacent first color filter elements is larger than that between the adjacent second color filter elements.

4. The liquid crystal display device according to claim 1, wherein the first and second color filters are formed of the same color filter as a blue color filter formed in the active area.

5. The liquid crystal display device according to claim 1, further comprising a touch panel on the second substrate.

6. The liquid crystal display device according to claim 1, wherein the first substrate further includes a counter electrode and an insulating film formed between the pixel electrode and the counter electrode, and slits are formed in the pixel electrode so as to oppose the counter electrode.

7. A liquid crystal display device, comprising:
a first substrate including;
   a pixel electrode arranged in an active area to display an image in the first substrate,
   a seal area surrounding the active area, and
   a first pillar-shaped spacer arranged adjacent to the active area and second pillar-shaped spacer arranged adjacent to the seal area in an intermediate area located between the active area and the seal area,
a second substrate including;
   a peripheral light shielding layer extending from the intermediate area to the seal area,
   a first color filter having two or more first color filter elements with a width and laminated on the peripheral light shielding layer right above the first pillar-shaped spacer in the shape of a belt or an island,
   a second color filter having two or more second color filter elements with an approximately same width as that of the first color filter elements, the second color filter being laminated on the peripheral light shielding layer right above the second pillar-shaped spacer in the shape of a belt or an island, wherein the interval between the adjacent second color filter elements of the second color filter is smaller than that between the adjacent first color filter elements, and
   an overcoat layer laminated on the first and second color filters,
a seal material arranged on the seal area of the first substrate to attach the first and second substrates in the shape of a closed loop; and
a liquid crystal layer held between the first and second substrates;
wherein the thickness of the overcoat layer arranged between the first pillar-shaped spacer and the first color filter is smaller than that arranged between the second pillar-shaped spacer and the second color filter.

8. The liquid crystal display device according to claim 7, wherein the first substrate further includes a counter electrode and an insulating film formed between the pixel electrode and the counter electrode, and slits are formed in the pixel electrode so as to oppose the counter electrode.

9. The liquid crystal display device according to claim 7, wherein the first and second color filters are formed of the same color filter as a blue color filter arranged in the active area.

10. The liquid crystal display device according to claim 7, further comprising a touch panel on the second substrate.

11. A liquid crystal display device, comprising:
a first substrate including;
   a pixel electrode arranged in an active area to display an image in the first substrate,
   a seal area surrounding the active area, and
   an intermediate area located between the active area and the seal area,
a second substrate including;
   a peripheral light shielding layer extending from the intermediate area to the seal area,
   an overcoat layer laminated on the second substrate,
a seal material arranged on the seal area of the first substrate to attach the first and second substrates, and a liquid crystal layer held between the first and second substrates;
wherein the liquid crystal display device further comprises:
a first pillar shaped-spacer formed between the first substrate and the overcoat layer to form a first cell gap between the first and second substrates in the active area;
a second pillar-shaped spacer formed between the first substrate and the overcoat layer and arranged adjacent to the active area to form a second cell gap between the first and second substrates in the intermediate area, a first color filter with a first width being laminated on the peripheral light shielding layer right above the second pillar-shaped spacer in the shape of a belt or an island,
a third pillar-shaped spacer formed between the first substrate and the overcoat layer and arranged adjacent to the seal area to form a third cell gap between the first and second substrates in the intermediate area, a second color filter with a second width different from the first width being laminated on the peripheral light shielding layer right above the third pillar-shaped spacer in the shape of a belt or an island, and a fourth pillar-shaped spacer formed between the first substrate and the overcoat layer and arranged to form a fourth cell gap between the first and second substrates in the seal area; and wherein the relation among the respective cell gaps between the first and second substrates is expressed by the following equation;

$$\text{first cell gap} \leq \text{second cell gap} < \text{third cell gap} \leq \text{fourth cell gap}.$$

12. The liquid crystal display device according to claim 11, wherein the seal material is formed in the shape of a rectangle and includes four line portions along the active area formed in the shape of a rectangle.

13. The liquid crystal display device according to claim 11, wherein the thickness of the respective first and second color filters in the intermediate area is approximately the same as that of the color filter in the active area.

14. The liquid crystal display device according to claim 11, wherein the seal material surrounds the first and second color filters in the intermediate area.

15. The liquid crystal display device according to claim 11, further comprising a touch panel on the second substrate.

16. A liquid crystal display device, comprising:
a first substrate including;
a pixel electrode arranged in an active area to display an image in the first substrate,
a seal area surrounding the active area, and
an intermediate area located between the active area and the seal area,
a second substrate including;
a peripheral light shielding layer extending from the intermediate area to the seal area, and
an overcoat layer laminated on the second substrates,
a seal material arranged on the seal area of the first substrate to attach the first and second substrates; and
a liquid crystal layer held between the first and second substrates;
wherein the liquid crystal display device further comprises:
a first pillar shaped-spacer formed between the first substrate and the overcoat layer to form a first cell gap between the first and second substrates in the active area;
a second pillar-shaped spacer arranged adjacent to the active area to form a second cell gap between the first and second substrates in the intermediate area including a first color filter having two or more first color filter elements with a width, the first color filter being laminated on the peripheral light shielding layer right above the second pillar-shaped spacer in the shape of a belt or an island,
a third pillar-shaped spacer arranged adjacent to the seal area to form a third cell gap between the first and second substrates in the intermediate area and including a second color filter having two or more second color filter elements with an approximately same width as that of the first filter layer, the second color filter being laminated on the peripheral light shielding layer right above the third pillar-shaped spacer in the shape of a belt or an island, wherein the interval between the adjacent second color filter elements of the second color filter is smaller than that between the adjacent first color filter elements; and
a fourth pillar-shaped spacer arranged to form a fourth cell gap between the first and second substrates in the seal area; and
wherein the relation among the respective cell gaps between the first and second substrates is expressed by the following equation;

$$\text{first cell gap} \leq \text{second cell gap} < \text{third cell gap} \leq \text{fourth cell gap}.$$

17. The liquid crystal display device according to claim 16, wherein the seal material is formed in the shape of a rectangle and includes four line portions along the active area formed in the shape of rectangle.

18. The liquid crystal display device according to claim 16, wherein the thickness of the respective first and second color filters in the intermediate area is approximately the same as that of the color filter in the active area.

19. The liquid crystal display device according to claim 18, wherein the first and second color filters are formed of a blue color filter formed in the active area.

20. The liquid crystal display device according to claim 16, further comprising a touch panel on the second substrate.

* * * * *